M. W. SIZEMORE.
SAW.
APPLICATION FILED FEB. 16, 1910.
991,249.
Patented May 2, 1911.
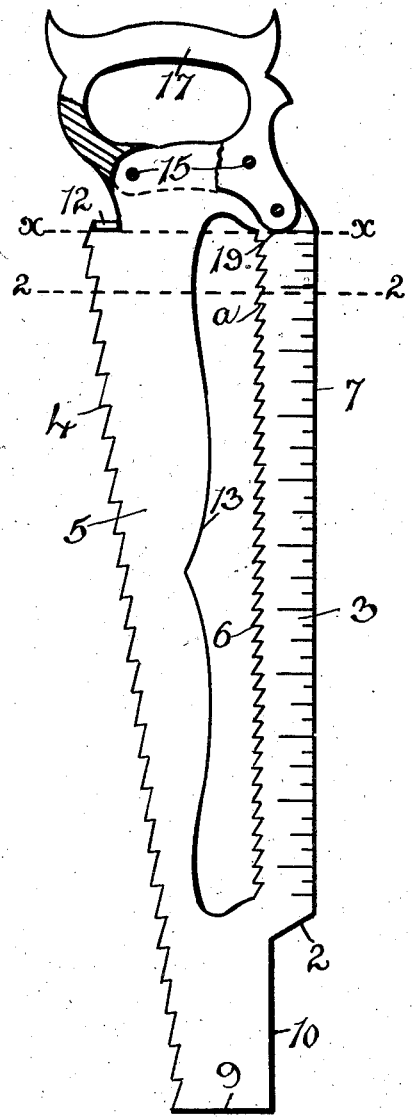
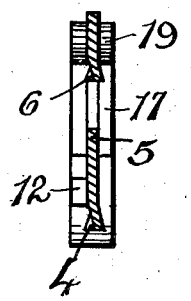
WITNESSES:
M. Smith.
Ursula M. Lewis.
INVENTOR
Martha W. Sizemore
By Geo. W. Iues, Attorney

UNITED STATES PATENT OFFICE.

MARTHA W. SIZEMORE, OF COBB, KENTUCKY.

SAW.

991,249.   Specification of Letters Patent.   Patented May 2, 1911.

Application filed February 16, 1910. Serial No. 544,182.

*To all whom it may concern:*

Be it known that I, MARTHA W. SIZEMORE, a citizen of the United States, and resident of Cobb, in the county of Caldwell and State of Kentucky, have invented certain new and useful Improvements in Saws, of which the following is a specification, reference being had to the accompanying drawings.

This invention relates to improvements in tools and comprises a saw.

The primary object of my invention, is to provide an apertured hand saw including a blade having two lines of saw teeth, and a straight edge, to provide a set of coarse teeth along one edge and a set of fine teeth along one edge of said aperture, with a stop forming ear and a handle having a stop forming extension, so that the straight edge of said saw may be made to serve as a square, in conjunction with said ear and extension.

A further object is to provide a saw blade having a lengthwise running aperture presenting a straight tooth edge to form two lines of saw teeth extending in like direction.

With these and other objects in view the present invention consists in the combination and arrangement of parts as will be hereinafter more fully described and particularly pointed out in the appended claims, it being understood that changes in the specific structure shown and described may be made within the scope of the claims without departing from the spirit of the invention.

In the drawings forming a part of this specification and in which like numerals of reference refer to similar parts, Figure 1, shows a side view with portions broken away of a saw embodying my invention. Fig. 2, is a section on line 2 of Fig. 1.

My invention has for its aim, a hand saw, so constructed that the same may be used as a cross-cut or rip saw, for coarse work, but including an auxiliary blade or portion having a fine set or line of teeth, which can be used in connection with small work where accuracy and a smooth cut is required.

In carrying out the aim of my invention, I employ a blade 5, having a serrated edge 4, to provide a coarse line of teeth, while the opposite edge 7, of the blade serves as a straight edge. The edge 7, runs oblique to the tooth edge 4. The coarse line of teeth extend the full distance of the saw blade, but the opposite edge 7, ends short of the edge 9. By this means the end of the saw forms a square. At the largest and handle forming end of the blade, and at the end of the line of coarse teeth 4, is the laterally extending stop lip 12, forming an integral part of the blade. The blade is further provided with a lengthwise running aperture 1, one edge 13, of which is curved, while the opposite edge is serrated and runs parallel to the straight edge 7. Near the handle end, the blade has suitable openings, to receive the rivets 15, by means of which the blade is secured within the slotted handle 17.

As shown, the saw teeth 6, are much finer than the teeth 4, and extend in a direction similar to the coarse teeth 4. In using the saw as a rip saw the finer set of teeth 6, serve as clearers, preventing the saw from wedging in the saw slot, as is often the case. In ordinary coarse work, the tooth edge 4, is employed. However, where fitting and accurate piecing of small boards, battens and the like is necessary, the auxiliary saw portion 3, is brought into play with its line of fine teeth, the work piece being placed into the opening 1. During the operation of the fine saw teeth 6, the coarse teeth 4, are idle and in no way contact with the work piece.

The handle 17, has the stop forming extension 19, while the ear 12, is held on a line at right angles to the straight edge 7. When a board is to be accurately marked with a line at right angles to an edge the operator simply forces the lip 12, and the extension 19, against the edge of the board when the straight edge 7, will demark a line at right angles to the edge of the board. A pencil or marking tool is then carried along the edge 7, to lay off the desired line. As shown the line of teeth 6, also extend in a line at right angles to the members 12 and 19.

The blade portion 3, between the edges 6 and 7, is graduated to form a rule as shown. The end 2, of the blade portion 3, is directed at an angle of say 120 degrees, to the edge 10.

By this means I provide a light, neat, simply constructed combination tool, especially adapted to the needs of a layman, who in performing an occasional job, of carpentering, does not usually have at his command a full kit of tools.

As the stub end 9, is held at right angles to the edge 7, the saw can be used as a try square. The edge 9, is further parallel to the lip and extension 19.

The saws are to be made in different sizes and as disclosed the line of teeth 6, are so spaced, that the saw upon this edge can also be used as a rule for measuring purposes. Further the teeth 6, serve as pointers so that all distances coinciding with the lateral edges $a$ of the teeth, can be accurately laid off, in making the markings against the teeth.

Having thus described my said invention what I claim as new and desire to secure by United States Letters Patent is:—

1. A hand saw comprising a blade one edge of which has a line of coarse teeth and a slot running lengthwise of said blade, one edge of said blade within said slot having a line of interior teeth finer than said edged teeth, said slot being sufficiently large to permit the insertion of a work-piece to be operated upon by said interior teeth.

2. A hand saw comprising a blade one edge of which has a line of coarse teeth and a slot running lengthwise of said blade, the edge of said blade within said slot farthest from said teeth having a line of interior smaller teeth extending in a direction coincident with said coarse teeth, said slot being of a size to permit the insertion of work to be operated upon by said interior teeth.

In testimony whereof I affix my signature, in presence of two witnesses.

MARTHA W. SIZEMORE.

Witnesses:
M. U. LAMB,
GEORGIA PASTEUR.